United States Patent
Watanabe et al.

(10) Patent No.: US 10,770,761 B2
(45) Date of Patent: Sep. 8, 2020

(54) FUEL CELL CONTROL DEVICE, CONTROL METHOD THEREOF, AND FUEL CELL VEHICLE

(71) Applicant: TOYOTA JIDOSHA KABUSHIKI KAISHA, Toyota-shi, Aichi-ken (JP)

(72) Inventors: Takao Watanabe, Nagakute (JP); Junichi Matsuo, Okazaki (JP); Shinji Aso, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 279 days.

(21) Appl. No.: 15/900,652

(22) Filed: Feb. 20, 2018

(65) Prior Publication Data
US 2018/0241099 A1   Aug. 23, 2018

(30) Foreign Application Priority Data

Feb. 20, 2017  (JP) .................................. 2017-029413
Feb. 19, 2018  (JP) .................................. 2018-027016

(51) Int. Cl.
*H01M 10/46*   (2006.01)
*H02J 7/34*    (2006.01)
(Continued)

(52) U.S. Cl.
CPC ............. *H01M 10/46* (2013.01); *B60L 1/003* (2013.01); *B60L 58/12* (2019.02); *B60L 58/40* (2019.02); *H01M 8/04302* (2016.02); *H01M 8/04303* (2016.02); *H01M 8/04626* (2013.01); *H01M 8/04947* (2013.01); *H01M 8/04955* (2013.01); *H01M 16/006* (2013.01); *H02J 1/06* (2013.01); *H02J 7/007* (2013.01); *H02J 7/0077* (2013.01); *H02J 7/34* (2013.01); *B60L 2210/14* (2013.01); *H01M 2220/20* (2013.01);
(Continued)

(58) Field of Classification Search
CPC ....................................................... H01M 10/46
USPC ........................................................ 320/101
See application file for complete search history.

(56) References Cited

U.S. PATENT DOCUMENTS

2007/0029121 A1 * 2/2007  Saitou ...................... B60K 6/46
                                                      180/65.285
2008/0238355 A1 * 10/2008 Muramatsu ............. B60L 58/33
                                                      320/101
(Continued)

FOREIGN PATENT DOCUMENTS

JP   2005-302491 A   10/2005
JP   2007-165055 A   6/2007

*Primary Examiner* — Jerry D Robbins
(74) *Attorney, Agent, or Firm* — Finnegan, Henderson, Farabow, Garrett & Dunner, LLP (57) ABSTRACT

Under a condition that a command to stop a fuel cell system is received and a state of charge of a secondary battery is equal to or lower than a threshold which is a value obtained by adding a first predetermined value to a lower limit at which electric power required to stop and start the fuel cell system is supplied, forced charging of the secondary battery by a fuel cell is performed until the state of charge reaches the threshold. After the forced charging is performed, in a case where the command to stop the fuel cell system is received within a predetermined period, the controller sets the threshold to a value obtained by adding a second predetermined value lower than the first predetermined value to the lower limit under the condition.

8 Claims, 4 Drawing Sheets (51) Int. Cl.
*H01M 8/04828* (2016.01)
*B60L 58/40* (2019.01)
*H02J 1/06* (2006.01)
*H02J 7/00* (2006.01)
*B60L 58/12* (2019.01)
*B60L 1/00* (2006.01)
*H01M 8/04302* (2016.01)
*H01M 8/04303* (2016.01)
*H01M 8/04537* (2016.01)
*H01M 8/04955* (2016.01)
*H01M 16/00* (2006.01)

(52) U.S. Cl.
CPC ...... *H01M 2250/20* (2013.01); *H02J 2300/30* (2020.01); *Y02B 90/12* (2013.01); *Y02T 10/7005* (2013.01); *Y02T 10/7225* (2013.01); *Y02T 90/32* (2013.01)

(56) References Cited

U.S. PATENT DOCUMENTS

| | | | | |
|---|---|---|---|---|
| 2010/0119898 | A1* | 5/2010 | Imai | H01M 8/04156 |
| | | | | 429/430 |
| 2010/0251698 | A1* | 10/2010 | Hiranuma | B60K 6/46 |
| | | | | 60/278 |
| 2016/0280093 | A1* | 9/2016 | Obata | B60L 58/13 |
| 2016/0318416 | A1* | 11/2016 | Kamatani | B60L 3/0046 |

* cited by examiner

FUEL CELL CONTROL DEVICE, CONTROL METHOD THEREOF, AND FUEL CELL VEHICLE

INCORPORATION BY REFERENCE

The disclosure of Japanese Patent Application No. 2017-029413 filed on Feb. 20, 2017 including the specification, drawings and abstract is incorporated herein by reference in its entirety.

BACKGROUND

1. Technical Field

The disclosure relates to a fuel cell control device, a control method of a fuel cell control device, and a fuel cell vehicle.

2. Description of Related Art

Fuel cell vehicles equipped with a fuel cell system using a fuel cell and a secondary battery as a power source have attracted attention. The electric power supplied from the fuel cell system is supplied to electrical loads including a motor for traveling and auxiliary machines (for example, a radiator fan, a coolant pump, and an electric light).

The secondary battery in the fuel cell system stores electric power generated by the fuel cell. The electric power with which the secondary battery is charged is used, for example, as restarting electric power of the system after the fuel cell system is stopped. Therefore, when the state of charge (SOC) of the secondary battery is below the amount needed for the next starting of the system at the time when the fuel cell system is stopped, the secondary battery needs to be charged with the electric power generated by the fuel cell.

Japanese Unexamined Patent Application Publication No. 2007-165055 (JP 2007-165055 A) discloses that while a fuel cell system is stopped, charging is performed to secure a needed state of charge of a secondary battery for the next starting of the system.

SUMMARY

However, there may be cases where the charging performed while the fuel cell system is stopped takes a long time to secure the needed state of charge for the next starting. In addition, in a case where starting and stopping of the fuel cell system are repeated within a short time due to repeated traveling of a short trip, the charging time of the secondary battery during the traveling for the electric power consumption is shortened. As a result, the state of charge of the secondary battery while the fuel cell system is stopped is below a needed value for the next starting in many cases. Therefore, when starting and stopping of the fuel cell system are repeated, it takes a long time for charging to secure the state of charge of the secondary battery in many cases.

The disclosure provides a technique for shortening the charging time of a secondary battery of a fuel cell system in a case where starting and stopping of the fuel cell system are repeated.

A first aspect of the disclosure relates to a fuel cell control device including: a fuel cell system having a fuel cell and a secondary battery; and a controller configured to control the fuel cell system. The controller determines whether or not a state of charge of the secondary battery is equal to or lower than a threshold which is a value obtained by adding a first predetermined value to a lower limit at which electric power required to stop and start the fuel cell system is supplied. In a case where the controller receives a command to stop the fuel cell system and determines that the state of charge of the secondary battery is equal to or lower than the threshold, the controller controls the fuel cell system to perform forced charging of the secondary battery by the fuel cell until the state of charge reaches the threshold. Furthermore, the controller stops the fuel cell system after the forced charging is performed. After the fuel cell system is stopped, in a case where (i) the fuel cell system is started based on a request for starting the fuel cell system within the predetermined period and (ii) the controller receives the command to stop the fuel cell system within a predetermined period, the controller sets the threshold to a value obtained by adding a second predetermined value lower than the first predetermined value to the lower limit.

In the fuel cell control device according to the first aspect of the disclosure, the controller may set the threshold based on a temperature of the secondary battery.

In the fuel cell control device according to the first aspect of the disclosure, in a case where second forced charging is performed within the predetermined period after first forced charging is performed, the controller may set a time for performing the second forced charging to be longer than a time for performing the first forced charging.

In the fuel cell control device according to the first aspect of the disclosure, a time for performing the forced charging may be set based on the temperature of the secondary battery.

A second aspect of the disclosure relates to a fuel cell vehicle including the fuel cell control device according to the first aspect of the disclosure.

A third aspect of the disclosure relates to a control method of a fuel cell control device including a fuel cell system having a fuel cell and a secondary battery and a controller configured to control the fuel cell system. The control method includes: under a condition that (i) an instruction to stop the fuel cell system is received and (ii) a state of charge of the secondary battery is equal to or lower than a threshold which is a value obtained by adding a first predetermined value to a lower limit at which electric power required to stop and start the fuel cell system is supplied, performing forced charging of the secondary battery by the fuel cell until the state of charge reaches the threshold; stopping the fuel cell system after the forced charging is performed; and after the fuel cell system is stopped, in a case where (i) the fuel cell system is started based on a request for starting the fuel cell system and (ii) a command to stop the fuel cell system is output within a predetermined period, setting the threshold to a value obtained by adding a second predetermined value lower than the first predetermined value to the lower limit.

According to the aspects of the disclosure, it is possible to provide a technique for shortening the charging time of the secondary battery of the fuel cell system in a case where starting and stopping of the fuel cell system are repeated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the drawings. However, the scope of the disclosure is not limited thereto.

1. Configuration of Fuel Cell System

Figure 1:
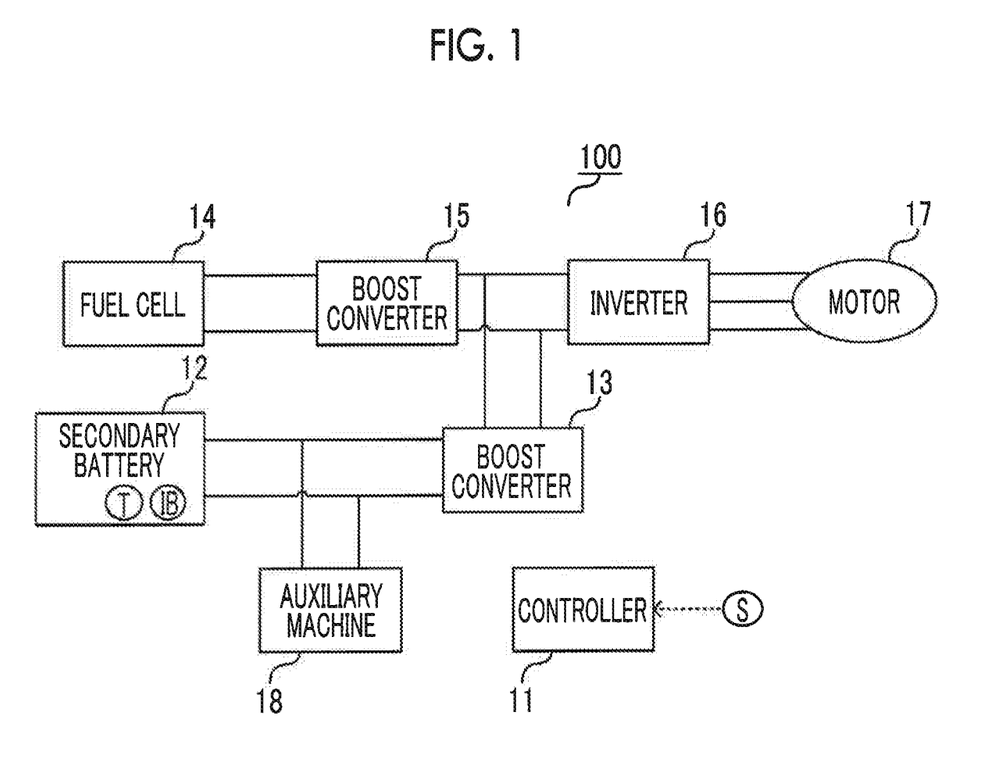
FIG. 1 is a view illustrating a schematic configuration of a fuel cell system according to an embodiment.

An example of a schematic configuration of a fuel cell system according to an embodiment of the disclosure will be described with reference to FIG. 1. A fuel cell system 100 includes a secondary battery 12, a boost converter 13, a fuel cell 14, a boost converter 15, an inverter 16, a motor 17, an auxiliary machine 18, and a speed sensor S as a main configuration. A controller 11 controls the fuel cell system 100. A fuel cell control device according to the embodiment is constituted by the controller 11 and the fuel cell system 100.

The fuel cell system 100 is mounted in a vehicle (moving body) such as a fuel cell vehicle (FCV). FIG. 1 shows solely the main configuration provided in the fuel cell system 100, and the fuel cell system 100 can include another configuration included in an arbitrary fuel cell system mounted in a moving body. Alternatively, the fuel cell system 100 may not be mounted in a moving body, and may be installed, for example, in a facility that needs electric power, such as a general house.

The secondary battery 12 is a chargeable and dischargeable power storage unit. For example, the secondary battery 12 is configured as a lithium-ion battery. The secondary battery 12 is interposed in the discharge path of the fuel cell 14 and is connected to the inverter 16 in parallel with the fuel cell 14. The secondary battery 12 outputs electric power obtained by subtracting a preset target output of the fuel cell from electric power needed for electrical loads including the motor 17 and the auxiliary machine 18 as drive electric power of the electrical loads. That is, the secondary battery 12 supplies drive electric power to the motor 17 and the auxiliary machine 18. Furthermore, the secondary battery 12 supplies electric power needed for starting and stopping the fuel cell system 100. In addition, the secondary battery 12 stores electric power obtained by power generation of the fuel cell 14 and electric power obtained by recovery from the motor 17.

The secondary battery 12 includes a temperature sensor T and a current sensor 1B. The temperature sensor T is a sensor that measures the temperature of the secondary battery 12 and outputs the measurement result. The current sensor 1B is a sensor that measures the discharge current of the secondary battery 12.

The boost converter 13 is a DC (direct current) voltage converter provided between the secondary battery 12 and the inverter 16. The boost converter 13 is configured using, for example, an intelligent power module (IPM). The boost converter 13 steps up the DC voltage of the electric power supplied from the secondary battery 12 and outputs the DC voltage of the electric power to the inverter 16.

The fuel cell 14 is configured to include a solid polymer electrolyte type cell stack formed by stacking a plurality of cells (a single battery (power generator) having an anode, a cathode, and an electrolyte) in series. In a normal power generation operation by the fuel cell 14, an oxidation reaction of Equation (1) occurs at the anode and a reduction reaction of Equation (2) occurs at the cathode. In the overall fuel cell 14, a power generation reaction of Equation (3) occurs, and thereby electric power is generated.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

The boost converter 15 is a DC voltage converter provided between the fuel cell 14 and the inverter 16. The boost converter 15 steps up the DC voltage of the electric power supplied from the fuel cell 14 and outputs the DC voltage of the electric power to the inverter 16. For example, the boost converter 15 is configured as an IPM.

The inverter 16 is an inverter provided between the boost converters 13, 15 and the motor 17. The inverter 16 converts the direct current electric power supplied from the fuel cell 14 or the secondary battery 12 into three-phase alternating current electric power and supplies the three-phase alternating current electric power to the motor 17. For example, the inverter 16 is configured as an IPM.

The motor 17 is a drive motor that generates a drive force for driving wheels and the like of a moving body in which the fuel cell system 100 is mounted. The motor 17 uses electric power supplied from the fuel cell 14 or the secondary battery 12 via the inverter 16 as drive electric power. Furthermore, the motor 17 recovers the kinetic energy of the moving body in which the fuel cell system 100 is mounted into electrical energy (for example, in accordance with the rotation of the motor 17). The secondary battery 12 is charged with the electric power generated by the recovery.

The auxiliary machine 18 is an auxiliary machine group including auxiliary machines used for power generation of the fuel cell 14. The auxiliary machine 18 includes, for example, a hydrogen pump and a coolant pump of a fuel cell. The auxiliary machine 18 uses the electric power supplied from the secondary battery 12 as drive electric power.

The speed sensor S is a sensor that acquires a measurement value of the movement speed of the moving body in which the fuel cell system 100 is mounted. The movement speed is calculated based on, for example, the rotation speed of the motor 17.

The controller 11 is configured as a computer having a central processing unit (CPU), a read-only memory (ROM), and a random-access memory (RAM). The controller 11 controls the processing and operation of each configuration provided in the fuel cell system 100 based on a signal input from another configuration, a program stored in a storage unit such as a RAM, and the like and performs various operations needed for the control.

For example, when the controller 11 receives a command to stop the fuel cell system 100, the controller 11 determines whether or not the state of charge (SOC) of the secondary battery 12 is equal to or lower than a threshold (a method of setting the threshold will be described later in detail) set to an amount higher than a state of charge needed for supplying electric power needed for the stopping operation of the fuel cell system 100 and the next starting operation of the fuel cell system 100. In a case where the state of charge of the secondary battery 12 is equal to or lower than the threshold, the controller 11 causes the fuel cell 14 to continue generating power before stopping the fuel cell system 100 and charges the secondary battery 12 with the generated electric power. In particular, in an extremely low temperature state (for example, a state at 0° C. or lower), operations including an end process, a parking purge (PPG), and sub-zero starting of the fuel cell 14, which are called three sub-zero operations, are performed. Therefore, the secondary battery 12 is charged to secure the state of charge at which electric power needed for at least the above-mentioned operations can be supplied. Details of a control process by the controller 11 at the time when the fuel cell system 100 is stopped will be described later.

Here, the end process of the fuel cell 14 is a process of discharging water from the stack of the fuel cell 14 by an air compressor. The parking purge is a process of purging moisture in the stack of the fuel cell 14, which is performed immediately before the temperature reaches 0° C. or lower after the operation of the fuel cell 14 is stopped. The sub-zero starting is an operation of starting the fuel cell system 100 at sub-zero temperatures.

2. Control Flow of Stopping and Starting Fuel Cell System

Figure 2:
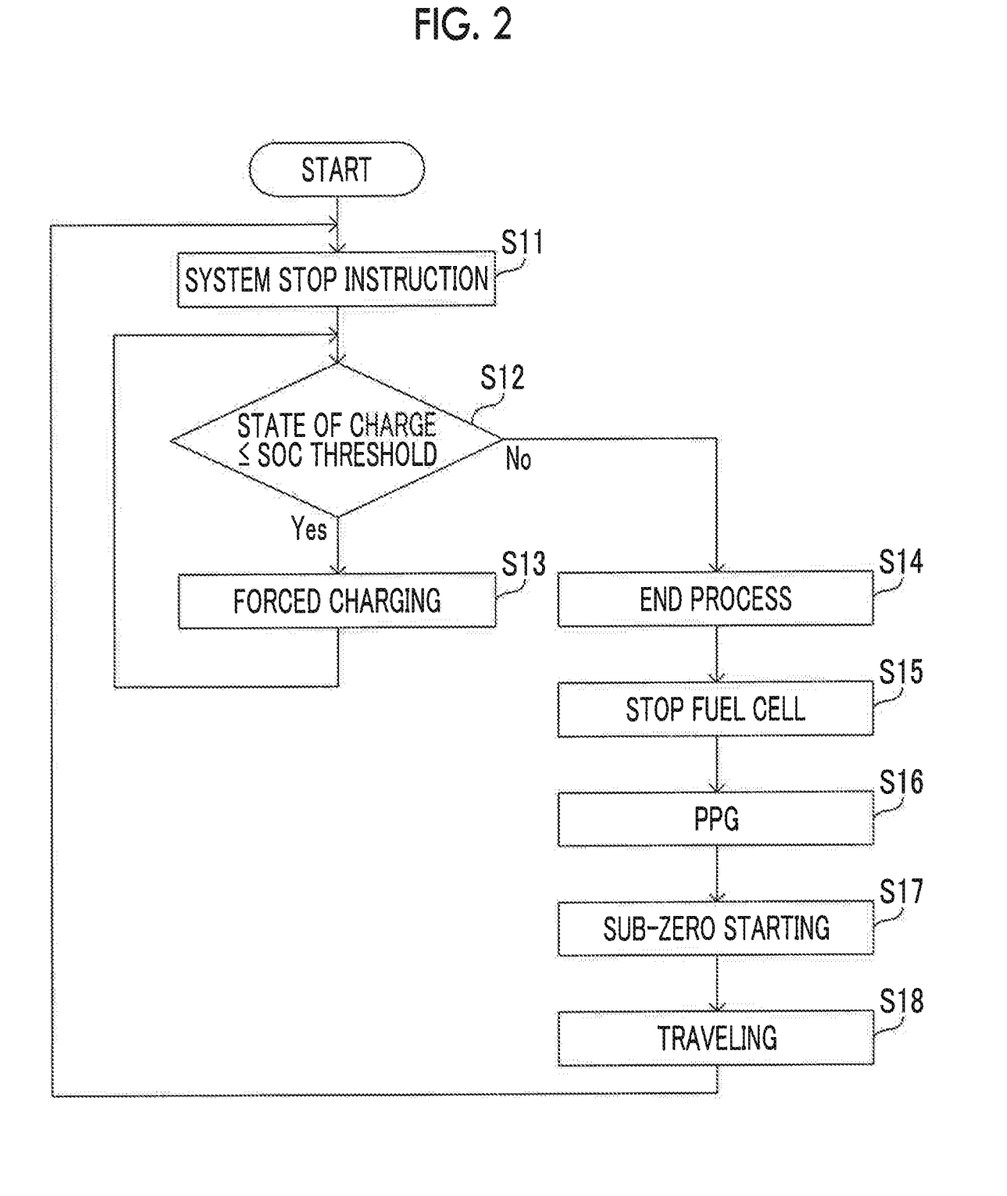
FIG. 2 is a flowchart showing control of charging and discharging of a secondary battery in the fuel cell system according to the embodiment.
Figure 3:
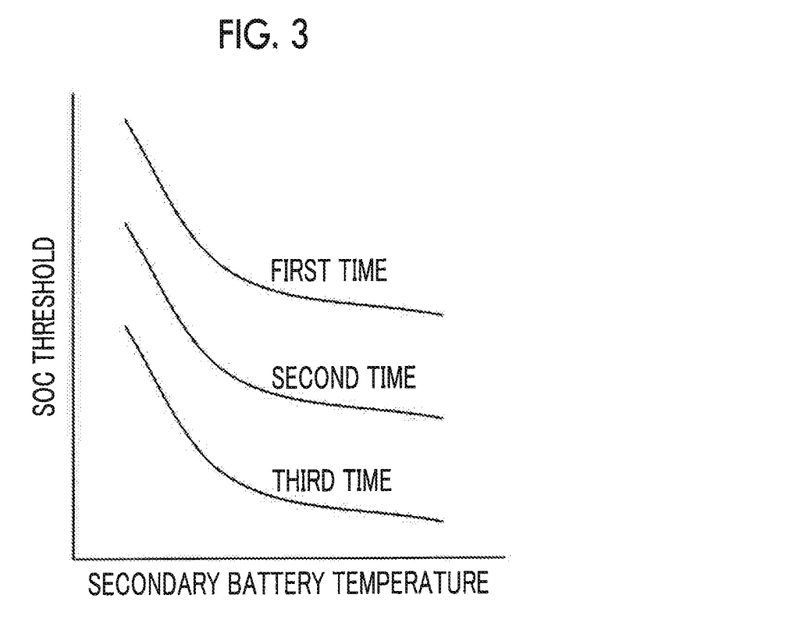
FIG. 3 is a graph showing an example of a method of setting a threshold used for the control of charging and discharging of the secondary battery in the fuel cell system according to the embodiment.
Figure 4:
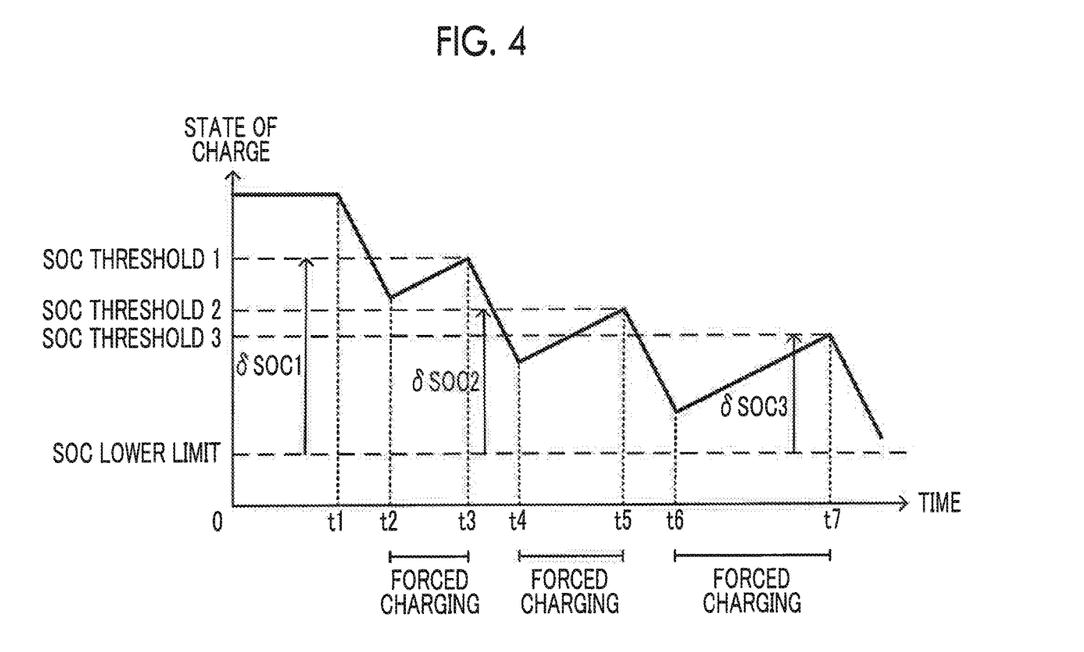
FIG. 4 is a graph showing the control of charging and discharging of the secondary battery in the fuel cell system according to the embodiment.

With reference to FIGS. 2 to 4, an example of control of stopping and starting the fuel cell system 100 will be described. First, with reference to FIG. 2, a flow of the control process in an extremely low temperature state (that is, a situation where the above-mentioned three sub-zero operations are performed) will be described. The control process mentioned above is performed under the control of the controller 11.

In the process shown in FIG. 2, first, when an ignition OFF operation, which is a command to stop the vehicle, is performed (when the command to stop (an instruction to stop) the fuel cell system 100 is received (step S11)), the controller 11 determines whether or not the state of charge of the secondary battery 12 is equal to or lower than a preset threshold (SOC threshold) (step S12). In a case where the state of charge of the secondary battery 12 is equal to or lower than the SOC threshold (Yes in step S12), the process proceeds to step S13. In a case where the state of charge of the secondary battery 12 is higher than the SOC threshold (No in step S12), the process proceeds to step S14.

The SOC threshold is set to a value obtained by adding a predetermined value (state of charge addition value: δSOC) to the state of charge (SOC lower limit) needed for supplying electric power needed for the stopping operation of the fuel cell system 100 and the next starting operation of the fuel cell system 100. The state of charge addition value is set to a value corresponding to the number of times that forced charging of the secondary battery 12 in step S13, which will be described later, performed due to traveling of a short trip with a short vehicle traveling distance is continuously performed within a predetermined period (or the number of times that forced charging of which the execution interval is within a predetermined period is continuously performed). Specifically, as the number of times that traveling is continuously performed increases, the state of charge addition value can be set to a lower value. In addition, the state of charge addition value can be set to a value corresponding to the temperature of the secondary battery 12 acquired by the temperature sensor T of the secondary battery 12. For example, the state of charge addition value can be set to a higher value as the temperature of the secondary battery 12 decreases.

The graph of FIG. 3 conceptually shows the SOC threshold determined according to the state of charge addition value. In FIG. 3, the SOC threshold at the time when the forced charging of the secondary battery 12 is continuously performed for the second time is set to be lower than the SOC threshold at the time when the forced charging of the secondary battery 12 is performed for the first time, and the SOC threshold at the time when the forced charging of the secondary battery 12 is continuously performed for the third time is set to be further lower. In addition, it is shown that the SOC threshold is set to be higher as the temperature of the secondary battery 12 decreases.

Returning to the description of FIG. 2, in step S13, the controller 11 operates the fuel cell 14 to generate power and controls the secondary battery 12 to be charged (forcibly charged). The charging of the secondary battery 12 in step S13 is performed until the state of charge of the secondary battery 12 exceeds the SOC threshold (No in step S12). Therefore, as the SOC threshold shown in FIG. 3 increases, the charging is performed for a longer time, and as the SOC threshold decreases, the charging is performed for a shorter time.

After the state of charge of the secondary battery 12 exceeds the SOC threshold (No in step S12), the controller 11 performs a process of discharging water from the stack of the fuel cell 14 by the air compressor as the end process of the fuel cell 14 (step S14), stops the operation of the fuel cell 14 (step S15), and performs the parking purge (step S16).

Thereafter, when the controller 11 receives a request for starting the fuel cell system 100, the controller 11 performs the operation of starting the fuel cell system 100 at sub-zero temperatures (step S17). Thereafter, the vehicle provided with the fuel cell system 100 travels by the electric power supplied from the fuel cell system 100 (step S18), and the process returns to step S11.

FIG. 4 is a graph showing a time series change in the state of charge of the secondary battery 12 when stopping and starting the fuel cell system 100 are performed repeatedly within a predetermined period by the controller 11 according to the control shown in FIG. 2 in a case where traveling of a short trip is repeated in an extremely low temperature state. The SOC lower limit is the lower limit of the state of charge of the secondary battery 12 that can supply electric power required to stop and start the fuel cell system 100. SOC thresholds 1 to 3 are values obtained by adding different state of charge addition values to the SOC lower limit.

Referring to FIG. 4, at timing t1, when the ignition OFF operation, which is the command to stop the vehicle, is performed (when the command to stop the fuel cell system 100 is received), since the state of charge of the secondary battery 12 is higher than the SOC threshold 1 (SOC lower limit+δSOC1) at timing t1, the stopping operation of the fuel cell system 100 and the like (S14 to S16) are performed by the controller 11. Electric power is consumed by the stopping operation of the fuel cell system 100 and the like, and the state of charge of the secondary battery 12 decreases. Thereafter, when the controller 11 receives the command to start the fuel cell system 100, the operation of starting the fuel cell system 100 at sub-zero temperatures (S17) is performed, and the vehicle starts traveling (S18). At timing t2 at which the traveling of the short trip ends and the command to stop the fuel cell system 100 is instructed (S11), the controller 11 determines that the state of charge of the secondary battery 12 is equal to or lower than the SOC threshold 1 (S12). As shown in FIG. 4, since the SOC at timing t2 is equal to or lower than the SOC threshold 1, forced charging of the secondary battery 12 by the fuel cell system 100 is performed (S13). Thereafter, when the state of charge increases to the SOC threshold 1 (timing t3), since the fuel cell system 100 is under the command to stop the fuel cell system 100, the controller 11 stops the fuel cell system 100 (S14 to S16). The state of charge of the secondary battery 12 is decreased by the stopping operation of the fuel cell 14.

Thereafter, when the vehicle travels a short trip within a short traveling time between timing t3 and timing t4, the electric power of the secondary battery 12 is used by the three sub-zero operations and traveling of the vehicle, and the state of charge of the secondary battery 12 further decreases. When the traveling of the short trip ends and the ignition OFF operation, which is the command to stop the vehicle, is performed again at timing t4 (when the command to stop the fuel cell system 100 (S11) is received), since the state of charge of the secondary battery 12 at this time is equal to or lower than the SOC threshold 2 (the SOC threshold which is a threshold set when forced charging is continuously performed within a short time and is set to a value lower than the SOC threshold 1 used for the previous determination: SOC lower limit+δSOC2), power generation of the fuel cell system 100 is continuously performed, and the forced charging is performed (S13). Thereafter, when the state of charge increases to the SOC threshold 2 (timing t5), the forced charging ends (timing t5), the stopping operation of the fuel cell 14 and the like (S14 to S16) are performed, and the state of charge of the secondary battery 12 decreases.

After the traveling of the short trip ends, when the ignition OFF operation, which is the command to stop the vehicle, is performed again at timing t6 (when the command to stop the fuel cell 14 is received), since the state of charge of the secondary battery 12 at this time is equal to or lower than the SOC threshold 3 (the SOC threshold which is a threshold set when forced charging is continuously performed within a short time and is set to a value lower than the SOC threshold 2 used for the previous determination: SOC lower limit+ δSOC3), the forced charging is performed. Thereafter, when the state of charge increases to the SOC threshold 3 (timing t7), the stopping operation of the fuel cell 14 or the like is performed, and the state of charge of the secondary battery 12 decreases.

As described above, according to the embodiment, under the condition that the controller 11 receives the instruction to stop the fuel cell system 100 and the state of charge of the secondary battery 12 is equal to or lower than the SOC threshold 1, the controller 11 performs the forced charging of the secondary battery 12 by the fuel cell 14 until the state of charge reaches the SOC threshold 1. Thereafter, when the vehicle travels a short trip within a predetermined period and then the instruction to stop the fuel cell system 100 is received, the controller 11 causes the fuel cell system 100 to perform the forced charging of the secondary battery 12 until the state of charge reaches the SOC threshold 2 under the condition that the state of charge of the secondary battery 12 is equal to or lower than the SOC threshold 2. As shown in FIG. 4, the state of charge addition value added to the SOC lower limit for the SOC threshold 2 is lower than the state of charge addition value added to the SOC lower limit for the SOC threshold 1. Therefore, the SOC threshold 2 is set to a value lower than the SOC threshold 1.

That is, after first forced charging is performed until the state of charge of the secondary battery 12 reaches the SOC threshold 1, in a case where second forced charging is performed within a predetermined period, the controller 11 controls the second forced charging to be performed until the state of charge of the secondary battery 12 reaches the SOC threshold 2 which is lower than the SOC threshold 1. As a result, the second forced charging can be completed within a shorter time compared to a case where charging is continuously performed until the state of charge reaches the SOC threshold 1. The charging time of the secondary battery 12 of the fuel cell 14 can be shortened in a case where starting and stopping of the fuel cell 14 are repeated.

In the embodiment, in a case where starting and stopping of the fuel cell system 100 are repeated within a predetermined period, the SOC threshold is set such that the time for performing the forced charging gradually increases. That is, as shown in FIG. 4, in such a manner that the difference between the SOC threshold 2 and the SOC threshold 3 is set to be smaller than the difference between the SOC threshold 1 and the SOC threshold 2, the value of the decrease in the SOC threshold is set to be smaller as the number of times of the forced charging within a predetermined period increases. As a result, assuming that the amount of the decrease in the state of charge in the three sub-zero operations is substantially constant, the more the number of times of the forced charging, the longer the time of the forced charging until the state of charge reaches the SOC threshold at that time. Therefore, in a case where the second forced charging is performed within a predetermined period after the first forced charging is performed, the controller 11 controls the time for performing the second forced charging so as to be longer than the time for performing the first forced charging. For example, the time for performing the first forced charging can be set to five minutes, and the time for performing the second forced charging can be set to ten minutes.

During the control shown in FIG. 4, the SOC thresholds 1 to 3 are set such that the time for performing the forced charging (t2 to t3, t4 to t5, and t6 to t7) gradually increases as the number of times of the forced charging increases.

By controlling the time for performing the forced charging to gradually increase as the forced charging is repeated as described above, a user (for example, a driver of the fuel cell vehicle in which the fuel cell system 100 is mounted) can recognize that the state of charge gradually approaches the lower limit (the SOC lower limit).

As described below, it is also possible to set the time for performing the forced charging in a method that does not depend on the SOC threshold.

Figure 5:
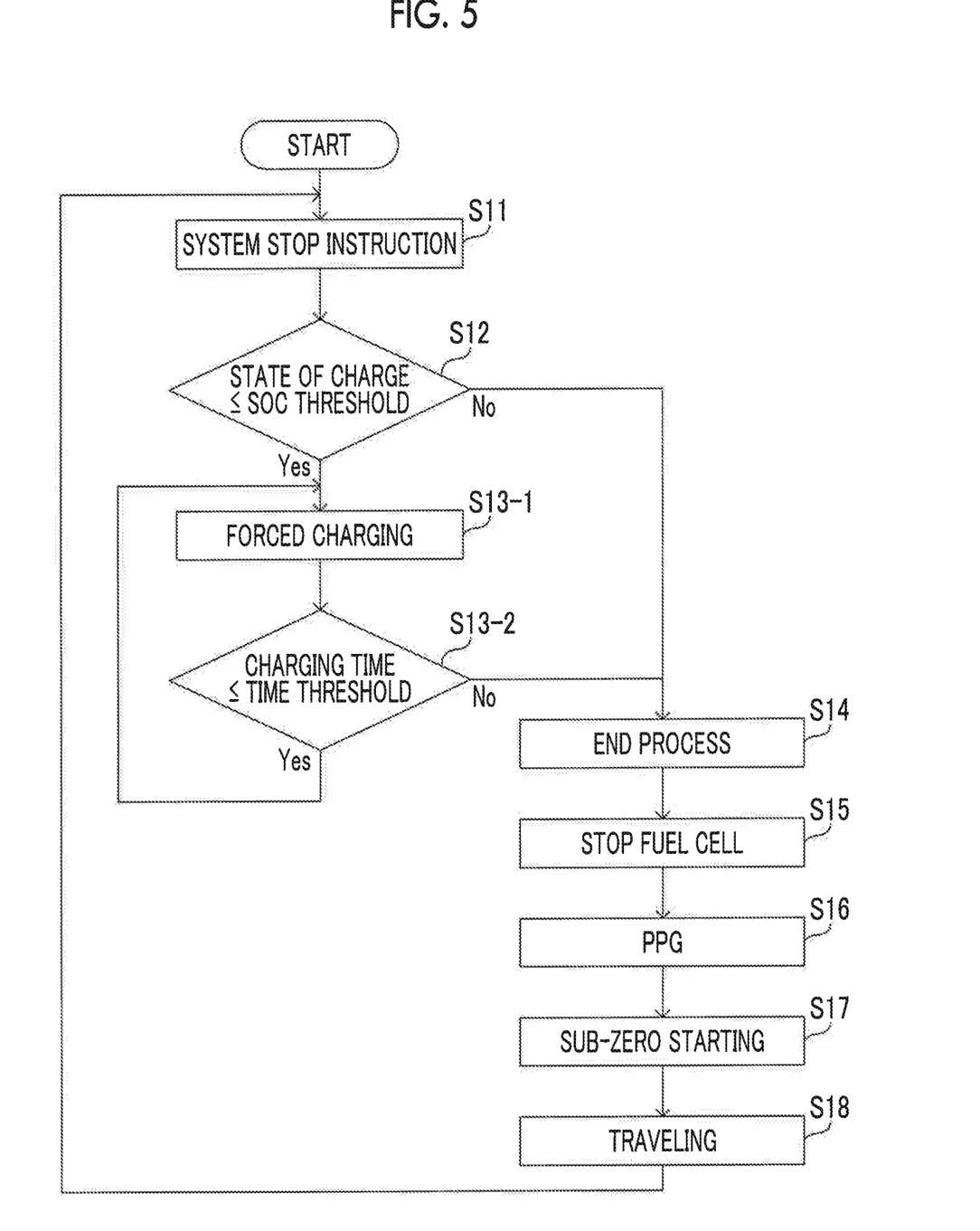
FIG. 5 is a flowchart showing the control of charging and discharging of the secondary battery in the fuel cell system according to the embodiment.

A modification of the above description will be described with reference to FIG. 5. In steps S11 and S12, the same process as that illustrated in FIG. 2 is performed. In a case of Yes in step S12 of FIG. 5, the controller 11 starts the forced charging in step S13-1 and continues the forced charging until the charging time reaches a preset time threshold (steps S13-1 and S13-2). After the forced charging ends (No in step S13-2), the process proceeds to step S14. The process from steps S14 to S18 is the same as that shown in FIG. 2.

The time threshold can be changed according to the temperature of the secondary battery 12 (For example, the charging time is set to be longer as the temperature becomes lower).

The time threshold can be set to a value corresponding to the number of times that the forced charging of the secondary battery 12 is continuously performed within a predetermined period (or the number of times that the forced charging of which the execution interval is within a predetermined period is continuously performed). Specifically, as the number of times that the forced charging is continuously performed within a predetermined period increases, the time threshold can be set to a longer time.

While the embodiments of the disclosure have been described above with reference to the drawings, the scope of the disclosure is not limited to the embodiments. It is apparent to those skilled in the art that various changes or modifications can be considered, and naturally belong to the technical scope of the disclosure. For example, in the above embodiments, a case where δSOC is changed according to the conditions has been described, but it is not intended to exclude a case where δSOC is fixed.

What is claimed is:

1. A fuel cell control device comprising:
   a fuel cell system having a fuel cell and a secondary battery; and
   a controller configured to control the fuel cell system, wherein:
   the controller is configured to determine whether or not a state of charge of the secondary battery is equal to or lower than a threshold which is set to a first threshold value obtained by adding an addition value to a lower limit at which electric power required to stop and start the fuel cell system is supplied, the addition value being set to a first predetermined value;
   in a case where the controller receives a command to stop the fuel cell system and determines that the state of charge of the secondary battery is equal to or lower than the threshold, the controller is configured to control the fuel cell system to perform a first forced charging of the secondary battery by the fuel cell until the state of charge reaches the threshold;
   the controller is configured to stop the fuel cell system after the first forced charging is performed; and
   after the fuel cell system is stopped, in a case where (i) the fuel cell system is started based on a request for starting the fuel cell system within a predetermined period and (ii) the controller receives the command to stop the fuel cell system within the predetermined period, the controller is configured to:
   set the threshold to a second threshold value obtained by adding the addition value, which is set to a second predetermined value lower than the first predetermined value, to the lower limit, and
   control the fuel cell system to perform a second forced charging of the secondary battery by the fuel cell if the state of charge of the secondary battery is equal to or lower than the threshold after being set to the second threshold value.

2. The fuel cell control device according to claim 1, wherein the controller is configured to set the threshold based on a temperature of the secondary battery.

3. The fuel cell control device according to claim 1, wherein, in a case where the second forced charging is performed within the predetermined period after the first forced charging is performed, the controller is configured to set a time for performing the second forced charging to be longer than a time for performing the first forced charging.

4. The fuel cell control device according to claim 1, wherein a time for performing at least one of the first forced charging or the second forced charging is set based on a temperature of the secondary battery.

5. A fuel cell vehicle comprising the fuel cell control device according to claim 1.

6. The fuel cell control device according to claim 1, wherein as a number of times that traveling is continuously performed increases, the controller is configured to set the addition value, which is added to the lower limit to obtain the threshold, to be a lower addition value.

7. The fuel cell vehicle according to claim 5, wherein as a number of times that traveling is continuously performed increases, the controller is configured to set the addition value, which is added to the lower limit to obtain the threshold, to be a lower addition value.

8. A control method of a fuel cell control device including a fuel cell system having a fuel cell and a secondary battery and a controller configured to control the fuel cell system, the control method comprising:
   under a condition that (i) an instruction to stop the fuel cell system is received and (ii) a state of charge of the secondary battery is equal to or lower than a threshold which is set to a first threshold value obtained by adding a first predetermined value to a lower limit at which electric power required to stop and start the fuel cell system is supplied, performing a first forced charging of the secondary battery by the fuel cell until the state of charge reaches the threshold;
   stopping the fuel cell system after the first forced charging is performed; and
   after the fuel cell system is stopped, in a case where (i) the fuel cell system is started based on a request for starting the fuel cell system and (ii) a command to stop the fuel cell system is output within a predetermined period, setting the threshold to a second threshold value obtained by adding a second predetermined value lower than the first predetermined value to the lower limit and performing a second forced charging of the secondary battery by the fuel cell if the state of charge of the secondary battery is equal to or lower than the threshold after being set to the second threshold value.

* * * * *